(12) United States Patent
Lancaster (10) Patent No.: US 6,499,002 B1
(45) Date of Patent: Dec. 24, 2002

(54) SYSTEM AND METHOD FOR GENERATING A NOISE INDEX FOR A MECHANICAL SYSTEM

(75) Inventor: William E. Lancaster, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/494,244

(22) Filed: Jan. 31, 2000

Related U.S. Application Data
(60) Provisional application No. 60/120,442, filed on Feb. 17, 1999.

(51) Int. Cl.[7] .............................................. G01M 7/00
(52) U.S. Cl. ...................... 702/191; 702/190; 702/56; 702/75; 702/76; 73/570; 73/572
(58) Field of Search ................................ 702/111, 112, 702/113, 116, 124, 126, 182–186, 189–191, 193–199, 56, 33–35, 66, 75, 77, 78; 73/645–648, 572, 574, 587, 589

(56) References Cited

U.S. PATENT DOCUMENTS

| | | | | |
|---|---|---|---|---|
| 3,758,758 A | * | 9/1973 | Games et al. ............. | 235/151.3 |
| 3,842,663 A | * | 10/1974 | Harting et al. ............. | 73/67.2 |
| 4,380,172 A | * | 4/1983 | Imam et al. .............. | 73/659 |
| 4,471,308 A | * | 9/1984 | Gable et al. ............. | 324/416 |
| 4,837,471 A | | 6/1989 | Kostoss et al. ............. | 310/258 |
| 4,916,803 A | | 4/1990 | Estrada et al. ............. | 310/258 |
| 4,965,513 A | * | 10/1990 | Haynes et al. ............. | 324/158 |
| 5,465,221 A | * | 11/1995 | Merat et al. ............. | 364/552 |
| 5,523,701 A | * | 6/1996 | Smith et al. ............. | 324/772 |
| 5,961,464 A | * | 10/1999 | Poland ...................... | 600/458 |
| 6,144,924 A | * | 11/2000 | Dowling et al. ............. | 702/60 |
| 6,173,074 B1 | * | 1/2001 | Russo ...................... | 382/190 |
| 6,239,593 B1 | * | 5/2001 | Burkhardt et al. .......... | 324/233 |
| 6,297,742 B1 | * | 10/2001 | Canada et al. ............. | 340/635 |

OTHER PUBLICATIONS

Finley, William R., Hodowanec, Mark M., Holter, Warren G., An Analytical Approach to Solving Motor Vibration Problems, IEEE Paper No. PCIC–99–XX (no date).*
"39th GE Turbine State–of–the–Art Technology Seminar", Tab 1, ""F" Technology—the First Half–Million Operating Hours", H.E. Miller.
"39th GE Turbine State–of–the–Art Technology Seminar", Tab 2, "GE Heavy–Duty Gas Turbine Performance Characteristics", F. J. Brooks.
"39th GE Turbine State–of–the–Art Technology Seminar", Tab 3, "9EC 50Hz 170–MW Class Gas Turbine", A. S. Arrao.
"39th GE Turbine State–of–the–Art Technology Seminar", Tab 4, "MWS6001FA—An Advanced–Technology 70–MW Class 50/60 Hz Gas Turbine", Ramachandran et al.
"39th GE Turbine State–of–the–Art Technology Seminar", Tab 5, "Turbomachinery Technology Advances at Nuovo Pignone", Benvenuti et al.

(List continued on next page.)

Primary Examiner—Marc S. Hoff
Assistant Examiner—Jeffrey R West
(74) Attorney, Agent, or Firm—Nixon & Vanderhye P.C.

(57) ABSTRACT

A method and system for generating a noise index for a mechanical system in which noise data is acquired over a predetermined frequency range. A fundamental harmonic frequency is chosen and this fundamental harmonic frequency is used to mark harmonic and sub-harmonic data bins. The amplitude of the harmonic and sub-harmonic data bins are recorded and a plurality of sub-harmonic bins equally offset from the center of each harmonic frequency are averaged and the average is subtracted from the preceding harmonic level. The result is accumulated as harmonic content levels to generate a harmonic index number.

22 Claims, 7 Drawing Sheets

OTHER PUBLICATIONS

"39th GE Turbine State–of–the–Art Technology Seminar", Tab 6, "GE Aeroderivative Gas Turbines—Design and Operating Features", M.W. Horner.

"39th GE Turbine State–of–the–Art Technology Seminar", Tab 7, "Advance Gas Turbine Materials and Coatings", P.W. Schilke.

"39th GE Turbine State–of–the–Art Technology Seminar", Tab 8, "Dry Low $NO_x$ Combustion Systems for GE Heavy–Duty Turbines", L. B. Davis.

"39th GE Turbine State–of–the–Art Technology Seminar", Tab 9, "GE Gas Turbine Combustion Flexibility", M. A. Davi.

"39th GE Turbine State–of–the–Art Technology Seminar", Tab 10, "Gas Fuel Clean–Up System Design Considerations for GE Heavy–Duty Gas Turbines", C. Wilkes.

"39th GE Turbine State–of–the–Art Technology Seminar", Tab 11, "Integrated Control Systems for Advanced Combined Cycles", Chu et al.

"39th GE Turbine State–of–the–Art Technology Seminar", Tab 12, "Power Systems for the 21st Century "H" Gas Turbine Combined Cycles", Paul et al.

"39th GE Turbine State–of–the–Art Technology Seminar", Tab 13, "Clean Coal and Heavy Oil Technologies for Gas Turbines", D. M. Todd.

"39th GE Turbine State–of–the–Art Technology Seminar", Tab 14, "Gas Turbine Conversions, Modifications and Uprates Technology", Stuck et al.

"39th GE Turbine State–of–the–Art Technology Seminar", Tab 16, "Performance and Reliability Improvement for Heavy–Duty Gas Turbines, "J.R. Johnston.

"39th GE Turbine State–of–the–Art Technology Seminar", Tab 16, "Gas Turbine Repair Technology", Crimi et al.

"39th GE Turbine State–of–the–Art Technology Seminar", Tab 17, "Heavy Duty Turbine Operating & Maintenance Considerations", R. F. Hoeft.

"39th GE Turbine State–of–the–Art Technology Seminar", Tab 18, "Gas Turbine Performance Monitoring and Testing", Schmitt et al.

"39th GE Turbine State–of–the–Art Technology Seminar", Tab 19, "Monitoring Service Delivery System and Diagnostics", Madej et al.

"39th GE Turbine State–of–the–Art Technology Seminar", Tab 20, "Steam Turbines for Large Power Applications", Reinker et al.

"39th GE Turbine State–of–the–Art Technology Seminar", Tab 21, "Steam Turbines for Ultrasupercritical Power Plants", Retzlaff et al.

"39th GE Turbine State–of–the–Art Technology Seminar", Tab 22, "Steam Turbine Sustained Efficiency", P. Schofield.

"39th GE Turbine State–of–the–Art Technology Seminar", Tab 23, "Recent Advances in Steam Turbines for Industrial and Cogeneration Applications", Leger et al.

"39th GE Turbine State–of–the–Art Technology Seminar", Tab 24, "Mechanical Drive Steam Turbines", D. R. Leger.

"39th GE Turbine State–of–the–Art Technology Seminar", Tab 25, "Steam Turbines for STAG™ Combined–Cycle Power Systems", M. Boss.

"39th GE Turbine State–of–the–Art Technology Seminar", Tab 26, "Cogeneration Application Considerations", Fisk et al.

"39th GE Turbine State–of–the–Art Technology Seminar", Tab 27, "Performance and Economic Considerations of Repowering Steam Power Plants", Stoll et al.

"39th GE Turbine State–of–the–Art Technology Seminar", Tab 38, "High–Power–Density™ Steam Turbine Design Evolution", J. H. Moore.

"39th GE Turbine State–of–the–Art Technology Seminar", Tab 29, "Advances in Steam Path Technologies", Cofer, IV, et al.

"39th GE Turbine State–of–the–Art Technology Seminar", Tab 30, "Upgradable Opportunities for Steam Turbines", D. R. Dreier, Jr.

"39th GE Turbine State–of–the–Art Technology Seminar", Tab 31, "Industrial Steam Turbine Upgrades", R. C. Beck.

"39th GE Turbine State–of–the–Art Technology Seminar", Tab 32, "Thermal Performance Evaluation and Assessment of Steam Turbine Units", P. Albert.

"39th GE Turbine State–of–the–Art Technology Seminar", Tab 33, "Advances in Welding Repair Technology" J. F. Nolan.

"39th GE Turbine State–of–the–Art Technology Seminar", Tab 34, "Operation and Maintenance Strategies to Enhance Plant Profitability", MacGillivray et al.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al.

"39th GE Turbine State–of–the–Art Technology Seminar", Tab 37, "GE Combined Cycle Product Line and Performance", Chase, et al.

"39th GE Turbine State–of–the–Art Technology Seminar", Tab 38, "GE Combined Cycle Experience", Maslak et al.

"39th GE Turbine State–of–the–Art Technology Seminar", Tab 39, "Single–Shaft Combined Cycle Power Generation Systems", Tomlinson et al.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at Power Gen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3.

"Proceedings of the Advanced Turbine Systems Annual Program Review Meeting", vol. I, "H Gas Turbine Combined Cycle", J. Corman, p. 14.

"Proceedings of the Advanced Turbine Systems Annual Program Review Meeting", vol. I, "Overview of Westinghouse's Advanced Turbine Systems Program", Bannister et al., p. 22.

"Proceedings of the Advanced Turbine Systems Annual Program Review Meeting", vol. I, "Allison Engine ATS Program Technical Review", D. Mukavetz, p. 31.

"Proceedings of the Advanced Turbine Systems Annual Program Review Meeting", vol. I, "Advanced Turbine Systems Program Industrial System Concept Development", S. Gates, p. 43.

"Proceedings of the Advanced Turbine Systems Annual Program Review Meeting", vol. I, "Advanced Turbine System Program Phase 2 Cycle Selection", Latcovich, Jr., p. 64.

"Proceedings of the Advanced Turbine Systems Annual Program Review Meeting", vol. I, "General Electric ATS Program Technical Review Phase 2 Activities", Chance et al., p. 70.

"Proceedings of the Advanced Turbine Systems Annual Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.

"Proceedings of the Advanced Turbine Systems Annual Program Review Meeting", vol. I, "Advanced Turbine Systems Annual Program Review", William E. Koop, p. 89.

"Proceedings of the Advanced Turbine Systems Annual Program Review Meeting", vol. I, "The AGTSR Consortium: An Update", Fant et al., p. 93.

"Proceedings of the Advanced Turbine Systems Annual Program Review Meeting", vol. I, "Overview of Allison/AGTSR Interactions", Sy A. Ali, p. 103.

"Proceedings of the Advanced Turbine Systems Annual Program Review Meeting", vol. I, "Design Factors for Stable Lean Premix Combustion", Richards et al., p. 107.

"Proceedings of the Advanced Turbine Systems Annual Program Review Meeting", vol. I, "Ceramic Stationary Gas Turbine", M. van Roode, p. 114.

"Proceedings of the Advanced Turbine Systems Annual Program Review Meeting", vol. I, "DOE/Allison Ceramic Vane Effort", Wenglarz et al., p. 148.

"Proceedings of the Advanced Turbine Systems Annual Program Review Meeting", vol. I, "Materials/Manufacturing Element of the Advanced Turbine Systems Program", Karnitz et al., p. 152.

"Proceedings of the Advanced Turbine Systems Annual Program Review Meeting", vol. I, "Land–Based Turbine Casting Initiative", Mueller et al., p. 161.

"Proceedings of the Advanced Turbine Systems Annual Program Review Meeting", vol. I, "Pratt & Whitney Thermal Barrier Coatings", Bornstein et al., p. 182.

"Proceedings of the Advanced Turbine Systems Annual Program Review Meeting", vol. I, "Westinghouse Thermal Barrier Coatings", Development Goedjen et al., p. 194.

"Proceedings of the Advanced Turbine Systems Annual Program Review Meeting", vol. I, "High Performance Steam Development", Duffy et al., p. 200.

"Proceedings of the Advanced Turbine Systems Annual Program Review Meeting", vol. II, "Lean Premixed Combustion Stabilized by Radiation Feedback and Heterogeneous Catalysis", Dibble et al., p. 221.

"Proceedings of the Advanced Turbine Systems Annual Program Review Meeting", vol. II, Rayleigh/Raman/LIF Measurements in a Turbulent Lean Premixed Combustor, Nandula et al. p. 233.

"Proceedings of the Advanced Turbine Systems Annual Program Review Meeting", vol. II, "Lean Premixed Flames for Low $No_x$ Combustors", Sojka et al., p. 249.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276.

"Proceedings of the Advanced Turbine Systems Annual Program Review Meeting", vol. II, "Advanced Turbine Cooling, Heat Transfer, and Aerodynamic Studies", Han et al., p. 281.

"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies for Gas Turbine Power Plants", Vandsburger et al., p. 328.

"Proceedings of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371.

"Proceedings of the Advanced Turbine Systems Annual Program Review Meeting", vol. II, "Rotational Effects on Turbine Blade Cooling", Govatzidakia et al., p. 391.

"Proceedings of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415.

"Proceedings of the Advanced Turbine Systems Annual Program Review Meeting", vol. II, "Experimental and Computational Studies of Film Cooling With Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing, and Flame Structure Issues", Gupta et al., p. 516.

"Proceedings of the Advanced Turbine Systems Annual Program Review Meeting", vol. II, "Intercooler Flow Path for Gas Turbines: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al., p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", "ATS and the Industries of the Future", Denise Swink, p. 1.

"Proceedings of the Advanced Turbine Systems Annual Program Review Meeting", "Gas Turbine Association Agenda", William H. Day, p. 3.

"Proceedings of the Advanced Turbine Systems Annual Program Review Meeting", "Power Needs in the Chemical Industry", Keith Davidson, p. 17.

"Proceedings of the Advanced Turbine Systems Annual Program Review Meeting", "Industrial Advanced Turbine Systems Program Overview", David Esbeck, p. 27.

"Proceedings of the Advanced Turbine Systems Annual Program Review Meeting", "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Methodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution in Premixed Flames", Ashwani K. Gupta, p. 211.

"Proceedings of the Advanced Turbine Systems Annual Program Review Meeting", "Combustion Instability Studies for Application to Land–Based Gas Turbine Combustors", Robert J. Santoro, p. 233.

"Proceedings of the Advanced Turbine Systems Annual Program Review Meeting", Active Control of Combustion Instabilities in Low $NO_x$ Turbines, Ben T. Zinn, p. 253.

"Proceedings of the Advanced Turbine Systems Annual Program Review Meeting", "Life Prediction of Advanced Materials for Gas Turbine Application" Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodynamics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angle Injection", R. Goldstein, p. 447.

"Proceedings of the Advanced Turbine Systems Annual Program Review Meeting", "Study of Endwall Film Cooling with a Gap Leakage Using a Thermographic Phosphor Fluoresence Imaging System", Minking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine Systems", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advanced Turbine Systems Annual Program Review Meeting", "Land Based Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeeting", "Western European Status of Ceramics for Gas Turbines", Tibor Bornemisza, p. 659.

"Proceedings of the Advanced Turbine Systems Annual Program Review Meeting", "Status of Ceramic Gas Turbines in Russia", Mark van Roode, p. 671.

"Status Report: The U.S. Department of Energy's Advanced Turbine systems Program", facsimile dated Nov. 7, 1996.

"Testing Program Results Validate GE's H Gas Turbine— High Efficiency, Low Cost of Electricity and Low Emissions", Roger Schonewald and Patrick Marolda.

"Testing Program Results Validate GE's H Gas Turbine— High Efficiency, Low Cost of Electricity and Low Emissions", Slide Presentation—working draft.

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing an Pre–Commercial Demonstration, Phase 3", Document #486029, Oct. 1–Dec. 31, 1995, Publication Date, May 1, 1997, Report Nos.: DOE/MC/31176–5340.

"Utility Advanced Turbine System (ATS) Technology Readiness Testing and Pre–Commercial Demonstration—Phases", Document #486132, Apr. 1–Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration—Phase 3", Document #587906, Jul.–Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration" Jan. 1–Mar. 31, 1996, DOE/MC/31176–5338.

"Utility Advanced Turbine Systems (ATS) Technology Readiness Testing: Phase 3R", Document #756552, Apr. 1–Jun. 30, 1999, Publication Date, Sep. 1, 1999, Report Nos.: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176–18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

"Illustrated Vibration Diagnostic Chart", Table 2, Technical Association of Charlotte, P.C., 1996, pp. 1–5.

Berry, "Comparison of Motor Current Analysis and Vibration Analysis in Detecting Rotor Bar and Air Gap Eccentricity Problems in Induction Motors", 1997, pp. 4–1—4–31.

* cited by examiner

SYSTEM AND METHOD FOR GENERATING A NOISE INDEX FOR A MECHANICAL SYSTEM

CROSS-REFERENCE TO RELATED APPLICATION

This application claims priority from U.S. application Ser. No. 60/120,442, filed Feb. 17, 1999.

BACKGROUND OF THE INVENTION

The present invention generally relates to the testing and evaluation of mechanical systems and, more particularly, to a broadband energy resonance test for noise evaluation of mechanical systems such as generators.

In operation, mechanical systems such as generators produce noise. The "noise signature" of these mechanical systems generally includes components that are attributable to many different aspects of the system operation. In the case of generators, the noise signature may include components that are attributable to, for example, a loose core and keybar rattle.

Figure 1:
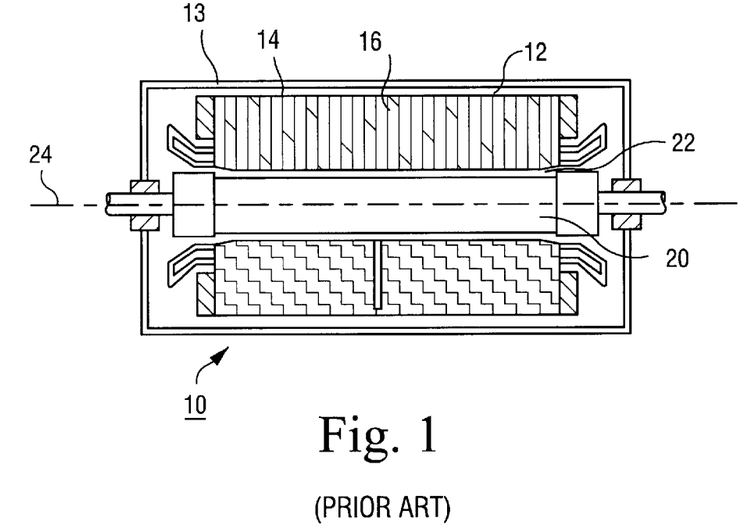
FIG. 1 is a cross-section of a conventional dynamoelectric machine.

FIG. 1 shows a cross-section of a simplified conventional dynamoelectric generator 10 shown in U.S. Pat. No. 4,837, 471. Generator 10 includes a stator 12 that has a generally annular shape. The outermost portion of generator 10 and stator 12 is the generator frame 13.

The stator core 14 is built up by stacking a large number of stator lamination sectors 16 together in a sandwich-like relationship. Stator lamination sectors 16 are attached to the stator using keybars. A rotor 20 is rotatably mounted in a cylindrical opening 22 formed along the central axis 24 of stator 12. That is, rotor 20 is coaxially positioned within stator 12 such that rotor 20 may be freely turned with respect to stator 12. Rotor 20 and stator 12 include respective windings (not shown). External excitation power is generally supplied to the rotor field windings via slip rings (not shown) coupled to an external power source. Thus, when mechanical energy is applied to rotor 20 to cause rotor 20 to spin on its axis 24, a moving magnetic field is generated which rotates at the same rate as rotor 20. This moving magnetic field cuts across the stator windings thus causing an electric current to be generated with the stator field windings.

Figure 2:
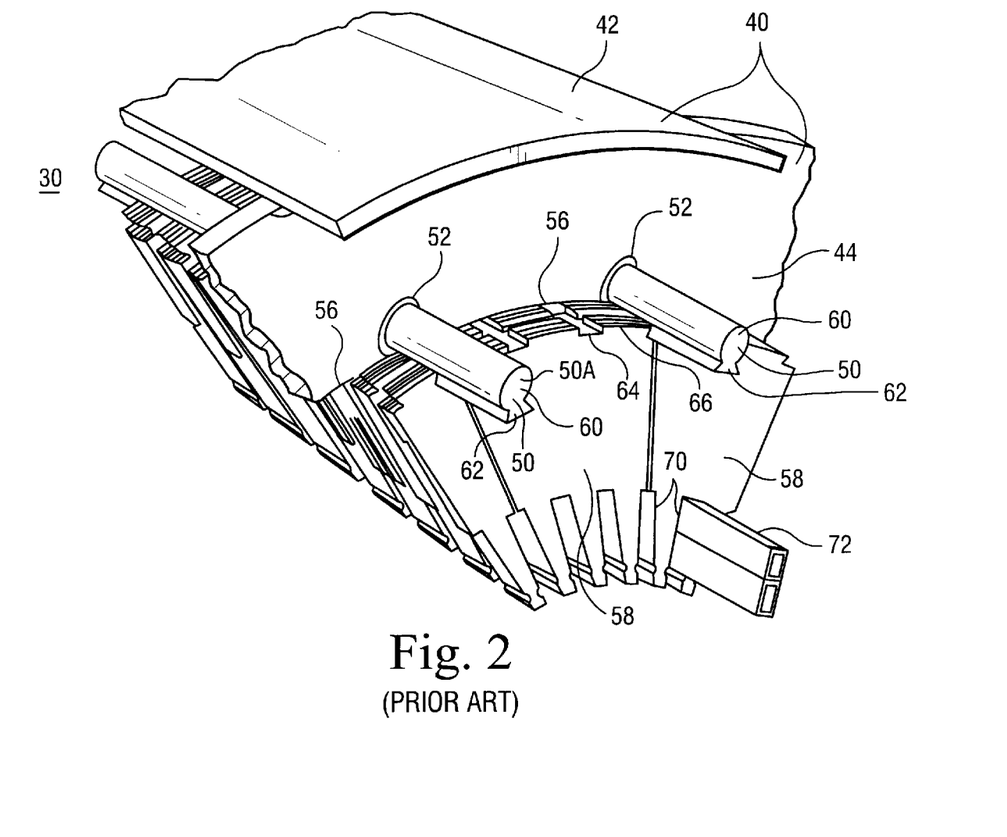
FIG. 2 is a perspective view of a portion of the stator of a conventional dynamoelectric machine.
Figure 3:
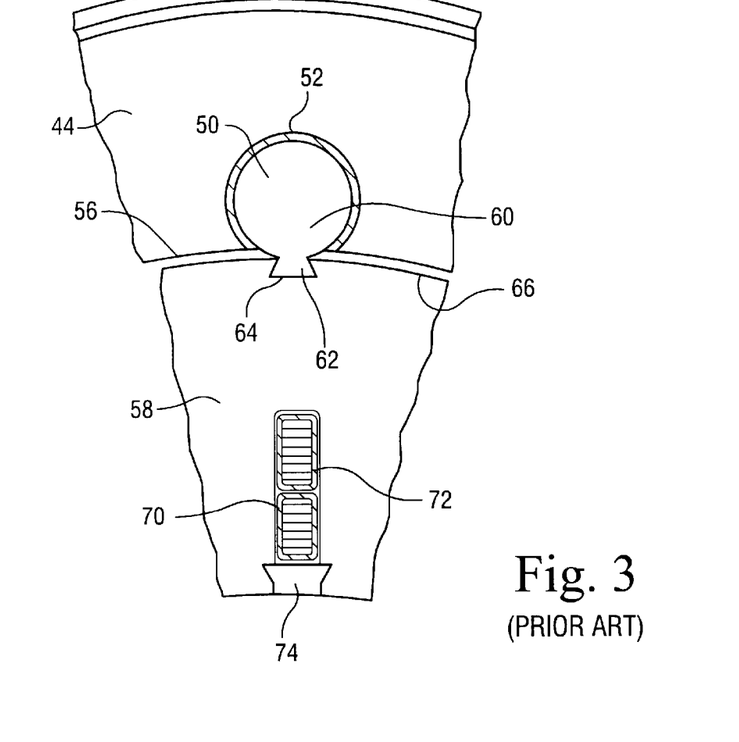
FIG. 3 is a cross-section of a portion of the stator of a conventional dynamoelectric machine.

FIG. 2 discloses a stator 30 which includes a generally annular stator frame 40, formed by outer wrapper 42 and a plurality of web plates arranged in annular fashion as indicated in the portion of stator 30 shown in perspective. Keybars 50 include opposed ends, one of which is shown as 50A. A plurality of keybars 50 are situated in respective holes 52 which are machined in the radially inner edge 56 of web plates 44. Keybars 50 are used to attach lamination sectors 58 to web plates 44. Each keybar has a cylindrical portion 60 that is situated within holes 52 and a dovetail portion 62 that extends radially inward from cylindrical portion 60. The dovetail portions 62 of keybars 50 mate with respective dovetail slots 64 in the radially outer curved edge 66 of stator core lamination sectors 58. The portion of stator 30 shown in FIGS. 2 and 3 includes one of a plurality of stator slots 70 which contain conventional current carrying conductors 72. Stator conductors 72 are held in slots 70 by a conventional dovetail retaining bar 74.

Generators with loose cores emit a single frequency transformer-type humming sound that, when harmonically filled, can be erroneously evaluated as keybar rattle caused by impacting of the dovetail to core iron (punchings). More specifically, keybar rattle is the result of a loose interface between the core iron (punchings) and the sections of the keybar designed to lock the punchings to the bar. Because the noise signature of a mechanical system such as a generator results from different factors, an intelligent and consistent condition-based acquisition and evaluation of noise data is desirable. In particular, it is important to differentiate between noise caused by different factors (e.g., loose core and keybar rattle) and to determine whether the noise data (or particular components thereof such as noise from keybar rattle) is indicative of any condition requiring repair and whether the repair must be done immediately or may be done at some later date.

BRIEF SUMMARY OF THE INVENTION

It is therefore seen to be desirable to accurately determine and evaluate the relative condition of mechanical system designs at different operational conditions.

During operation, mechanical systems emit a signature noise characteristic ranging from single frequency to either a random or harmonically filled spectrum. The method used in a preferred embodiment of the present invention is much like the differentiation (a specific frequency) and the evaluation (harmonic content) of a specific toned musical instrument within a fifty-piece band. The method is based on the theory that the accumulation of harmonic content within a generator noise spectrum creates a consistent signature index number relating to specific mechanical conditions within the generator. The harmonic peak picking and the subtracting of strategically averaged random noise effects create an intelligible representation of specific mechanical system conditions.

In accordance with a preferred embodiment of the present invention, a noise index for a mechanical system is generated by acquiring noise data over a predetermined frequency range. A fundamental harmonic frequency is chosen and this fundamental harmonic frequency is used to mark harmonic and sub-harmonic data bins. The amplitude of the harmonic and sub-harmonic data bins are recorded and a plurality of sub-harmonic bins equally offset from the center of each harmonic frequency are averaged, the average being subtracted from the preceding harmonic level. The results are accumulated as harmonic content levels indicative of a condition of the mechanical system. The results can be used to determine those conditions requiring repair as well as whether the repair must be done immediately or may be done at some later date.

DETAILED DESCRIPTION OF THE INVENTION

The contents of U.S. application Ser. No. 60/120,442, filed Feb. 17, 1999 are hereby incorporated by reference.

Figure 4:
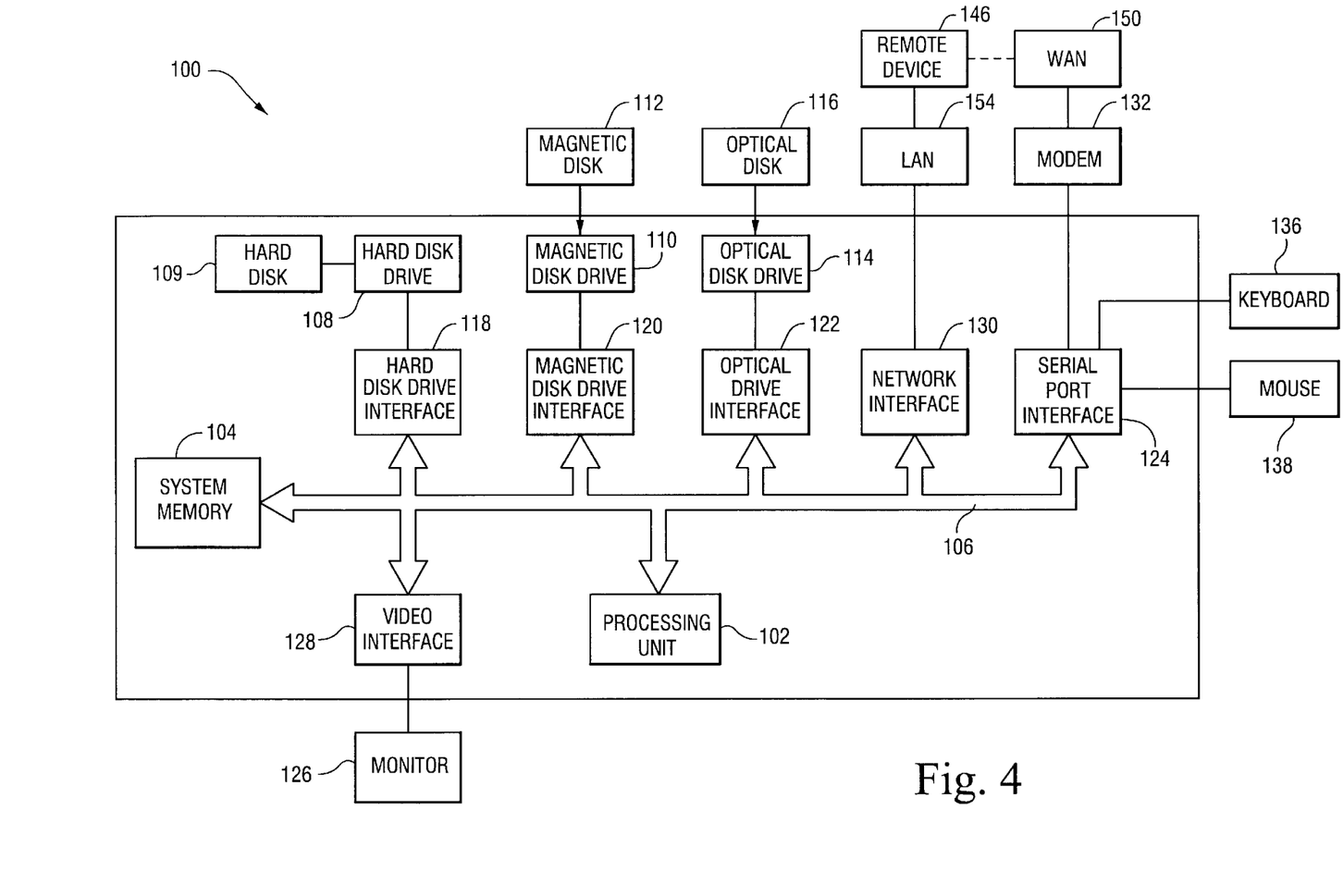
FIG. 4 is a generalized block diagram of a computing device usable to implement noise data processing in accordance with an embodiment of the present invention.

FIG. 4 and the following discussion are intended to provide a brief, general description of a suitable computing environment in which noise data processing may be implemented. FIG. 4 shows a general-purpose computing device in the form of a conventional personal computer 100 including a processing unit 102 and a system memory 104. A system bus 106 couples various system components including system memory 104 to processing unit 102. System bus 106 may be any of several types of bus structures including a memory bus or memory controller, a peripheral bus, and a local bus using any of a variety of bus architectures. System memory 104 typically includes a ROM (read only memory) and a RAM (random access memory). ROM generally stores a BIOS (basic input/output system). Personal computer 100 further includes various drives and associated computer-readable media. A hard disk drive 108 reads from and writes to a (typically fixed) magnetic hard disk 109; a magnetic disk drive 110 reads from and writes to a removable "floppy" or other magnetic disk 112; and an optical disk drive 114 reads from and, in some configurations, writes to a removable optical disk 116 such as a CD ROM or other optical media. Hard disk drive 108, magnetic disk drive 110, and optical disk drive 114 are connected to system bus 106 by a hard disk drive interface 118, a magnetic disk drive interface 120, and an optical drive interface 122, respectively. The drives and their associated computer-readable media provide nonvolatile storage of computer-readable instructions, data structures, program modules, and other data for personal computer 100. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on hard disk 109, removable magnetic disk 112, optical disk 116 and/or the ROM and/or the RAM of system memory 104. Such program modules may include an operating system providing graphics and sound APIs, one or more application programs, other program modules, and program data. A user may enter commands and information into personal computer 100 through input devices such as a keyboard 136 and a pointing device 138. Other input devices may include a microphone, joystick, game controller, satellite dish, scanner, or the like. These and other input devices are often connected to processing unit 102 through a serial port interface 124 that is coupled to system bus 106, but may be connected by other interfaces, such as a parallel port interface or a universal serial bus (USB). A monitor 126 or other type of display device is also connected to system bus 106 via an interface, such as a video adapter 128. In addition to the monitor, personal computers typically include other peripheral output devices, such as speakers and printers.

Personal computer 100 may also include a modem 132 or other means for establishing communications over wide are a network 150, such as the Internet. Modem 132, which may be internal or external, is connected to system bus 106 via serial port interface 124. A network interface 130 may also be provided for allowing personal computer 100 to communicate with one or more remote devices 146 via a local area network 154 (or such communication may be via wide area network 150 or other communications path such as dial-up or other communications means). As will be described in greater detail below, remote devices 146 may include data acquisition devices each including a sensor appropriately positioned to acquire noise data for a remotely located mechanical system.

The noise data processing in a preferred embodiment of the present invention generates a harmonic noise index number. This number provides a measure of the harmonic content of the acquired noise spectrum. A higher index number correlates to a greater harmonic content. The processing sensitizes the measurement of accumulated noise resulting from specific noise characteristics of a condition of a mechanical system (e.g., keybar rattle of a generator). The method resolves the inconsistent evaluation of consistent noise conditions to a level that detects a 5% change of specific design signatures while the overall decibels may increase or decrease. In this way, for example, a generator with loose keybars may be discerned from a generator with a loose core. The sensitivity of the response may be plotted as a function of load to calibrate the changes of operational effects.

Figure 5:
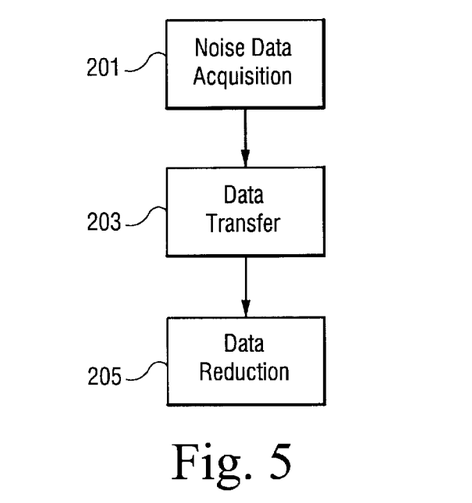
FIG. 5 illustrates the process flow in accordance with an embodiment of the present invention.

The overall mechanical system testing process is divided into three basic tasks as depicted in FIG. 5. These three tasks are: (1) noise data acquisition (block 201); (2) data transfer (block 203); and (3) data reduction (processing) (block 205).

Figure 6:
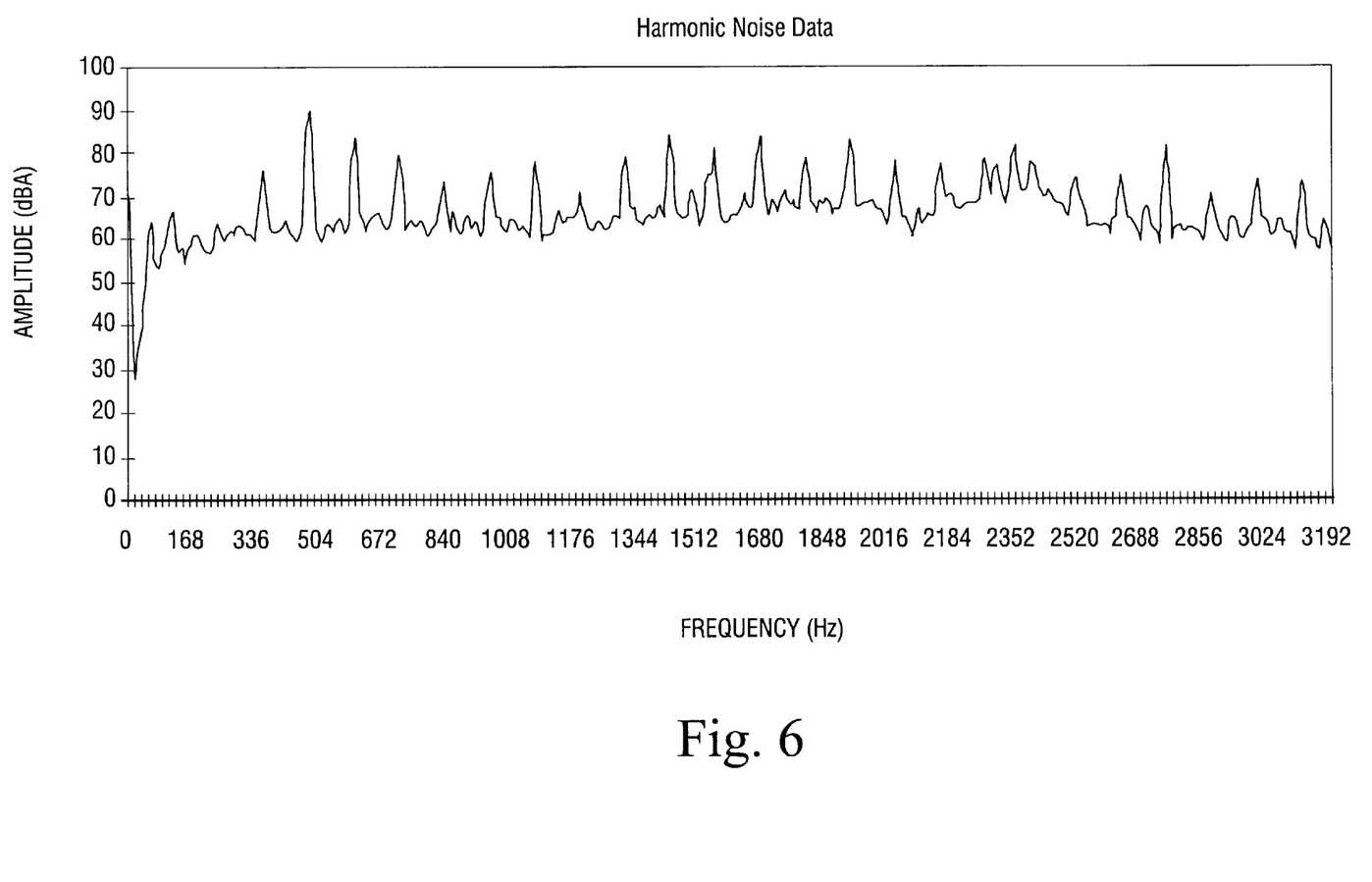
FIG. 6 is an exemplary spectral plot of acoustic data for a generator over a frequency range from 0–3200 Hz.
Figure 7A:
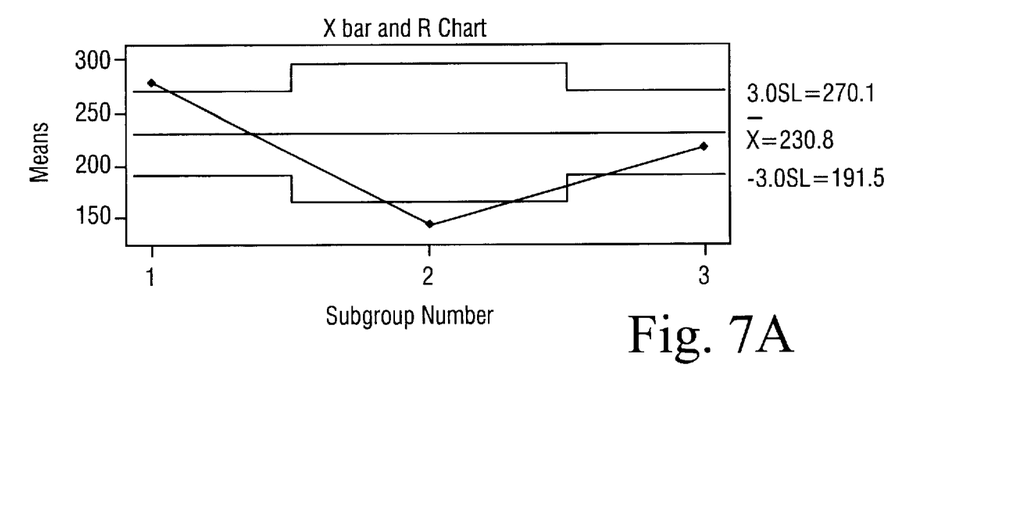
FIGS. 7A–7F are graphs illustrating the process capability of the harmonic index total value for three generators.
Figure 7B:
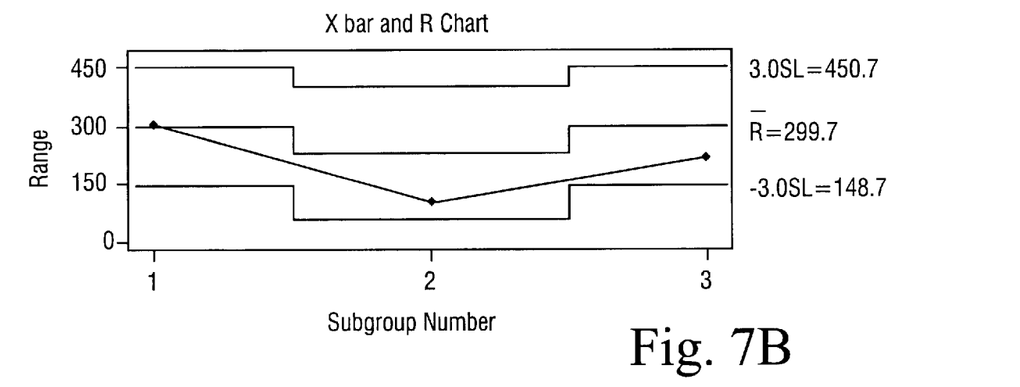
Figure 7C:
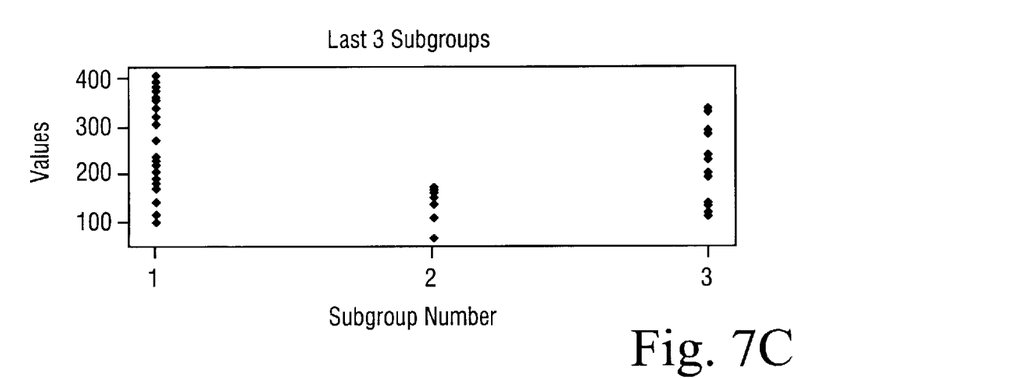
Figure 7D:
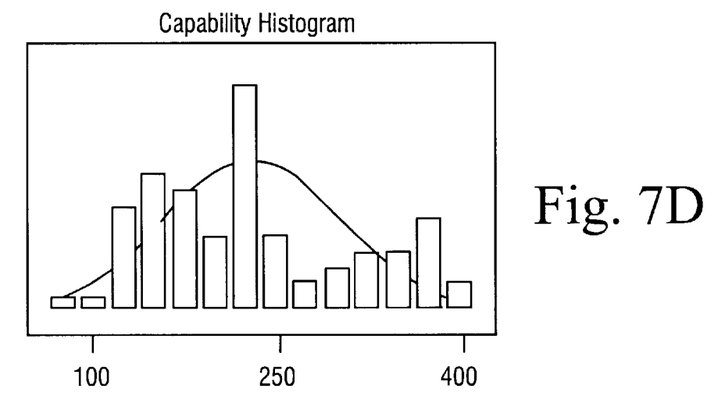
Figure 7E:
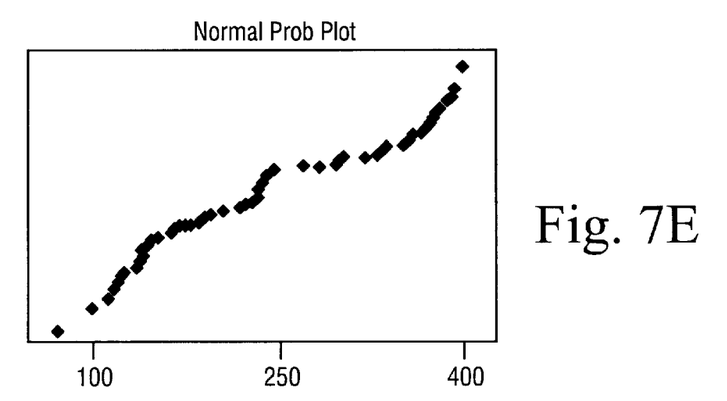
Figure 7F:
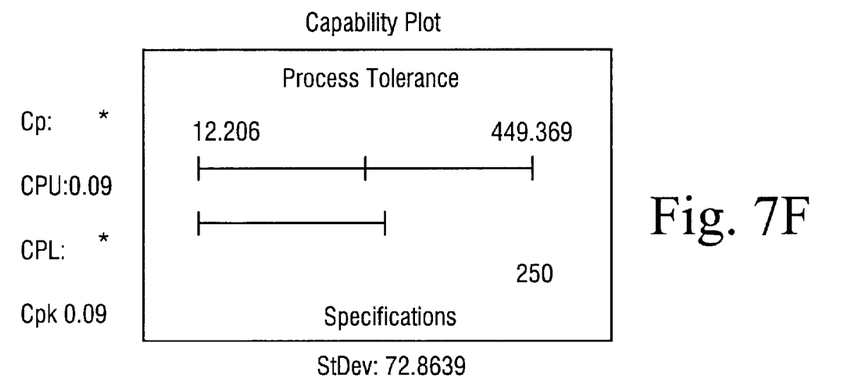

Acoustic noise data can be acquired using any commercially available data acquisition system capable acquiring data having a predetermined range of frequency content. For example, for evaluating keybar rattle of a generator, the frequency range may be from 0 Hz to 2000 Hz. Other ranges may be used with other mechanical systems. The data acquisition system includes a sensor (tranducer) that is positioned to acquire noise data of the mechanical system. The sensor converts the noise into electrical signals. In the case of generators, the noise data is preferably recorded at predetermined increments of load, e.g., at 0%, 25%, 50%, 75% and 100%. Noise data for generators may also be acquired for full turbine load, but not full generator load. This is a condition that can aggravate a keybar rattle problem, producing higher harmonic index numbers. For generators, the number of lines of spectral resolution of the data acquisition system should be 400 so that a frequency resolution of 5 Hz is obtained. The data is preferably recorded in units of dBR or dBA and the data acquisition system will generally be configured to output the recorded data in a conventional data format such as ASCII. An exemplary spectral plot of acoustic data for a generator over a frequency range from 0–3200 Hz is shown in FIG. 6.

It is contemplated that noise data may be gathered "in the field" by a technician who positions a portable data acquisition system to acquire noise data for the mechanical system to be tested. In this case, the noise data may be transferred to a computing device for subsequent processing, for example, using a magnetic disk or by connecting the portable data acquisition device to an interface of personal computer 100. The portable data acquisition device may also be connected to personal computer 100 via wide area network 150 or local area network 154. Alternatively, a data acquisition system may be permanently positioned to acquire noise data from the mechanical system and the data acquisition system may be connected by a communication link (such as the Internet) to a central computer such as personal computer 100 that gathers and processes the acquired data. In this arrangement, personal computer 100 is preferably configured to execute a data processing program to be described below.

A data processing program in accordance with an embodiment of the present invention for evaluating generator keybar rattle is shown in Appendix I as an EXCEL® spreadsheet macro which is executable by the personal computer 100 shown in FIG. 4. EXCEL is a registered trademark of Microsoft Corporation. Appendix II is a standard spreadsheet display derived with the use of the macro of Appendix I. It will of course be appreciated that other routines for implementing the present invention may be developed and the macro shown in Appendix I is provided by way of illustration, not limitation.

In accordance with the method embodied in the macro of Appendix I, a primary or fundamental harmonic frequency is chosen as a controlling parameter in order to make the growth of harmonics a more sensitive measurement of keybar rattle. In the case of a 50 Hz machine, 100 Hz is used as the fundamental harmonic frequency. In the case of a 60 Hz machine, 120 Hz is used as the fundamental harmonic frequency. From this frequency, harmonic and sub-harmonic data bins are marked and the amplitude is then recorded. Five sub-harmonic bins equally offset from the middle or center of a given harmonic frequency are then averaged and subtracted from the preceding harmonic level. The result or relative dB (dBR) is then accumulated as Odd, Even and Total harmonic content level. The total harmonic content level may be used as the harmonic noise index.

The primary or fundamental controlling frequency amplitude is not used in the calculations. The reason for this is that the primary electromechanical forcing function's relationship from the rotor to the stator when added to the growth of harmonic content can skew the results. For an example, a condition of very high forcing function response can be experienced without "keybar rattle." If the primary or fundamental controlling frequency amplitude were used in the calculations, the resulting index number would be increased without appropriate cause.

The generation of noise indices to discriminate keybar rattle will be discussed with reference to noise data acquired for three generators at multiple locations and, in some cases, multiple loads. The noise data was acquired at different data acquisition points (e.g., three or four locations) along the length of a generator. Data acquisition points noise data are typically at a distance of about 1 meter from the generator surface and about 1.5 meters above the mounting surface of the generator feet. Suitable noise data acquisition systems include a commercially available hand-held precision acoustic sound meter available from RION® Co., Ltd. and a data analyzer such as a HEWLETT-PACKARD® four-channel analyzer to which the sound meter is connected.

FIGS. 7A–7F are charts of process control and capability resulting from a "SixPack" analysis of the harmonic index total value for the acquired noise data subgrouped by the three units. The software for performing this SixPack analysis is part of a statistical software package available from Minitab Inc. (State College, Pa.)

Figure 8:
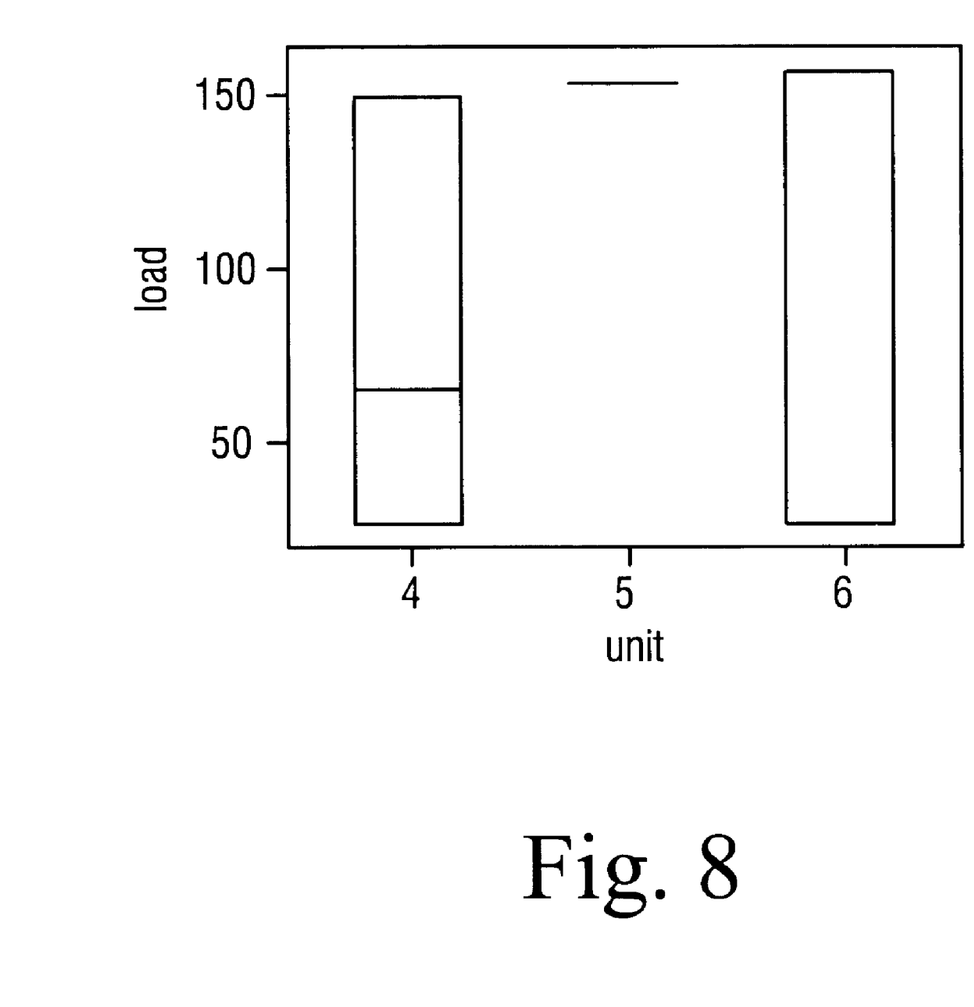
FIG. 8 is a boxplot of the loadpoints for the three generators.

The sub-group for unit #2 in FIGS. 7A–7F represents a unit for which only one load point was taken. A boxplot of the load is shown in FIG. 8. Unit #4 in FIG. 8 is unit #1 in the plots of FIGS. 7A–7F; unit #5 in FIG. 8 is unit #2 in the plots of FIGS. 7A–7F; and unit #6 in FIG. 8 is unit #3 in the plots of FIGS. 7A–7F. Unit #4 had data taken at 3 load points; unit #5 had data taken at 1 load point; and unit #6 had data taken at two load points.

In the case of the particular generators whose noise data is summarized in FIGS. 6 and 7, "250" can be taken as the noise index threshold for keybar rattle. Thus, a generator having an index above 250 is at a level that indicates keybar rattle. A generator having an index below 250 is at a level that suggests no keybar rattle problem. Of course, the index threshold "250" is provided by way of illustration, not limitation. It will be appreciated that such thresholds will differ from one mechanical system to another and even from one generator type to another, and will also depend on the mechanical condition of interest. It has been found that the data processing program set forth in Appendix I generates harmonic index numbers that are useful in evaluating the existence and severity of keybar rattle problems for generators. Generally speaking, relatively high harmonic index numbers generated in accordance with the program set forth in Appendix I may be viewed as being indicative of a keybar rattle problem and may be used as part of an assessment of what, if any, remedial action may be required.

Other data may be acquired to assist in the evaluation of the mechanical system. For example, vibration data may be acquired using, for example, bi-axial accelerometers available from PCB® Piezoelectronics Inc. that are connected to a HEWLETT-PACKARD® analyzer. In the case of a generator, the orientation of readings in the horizontal direction may be pointing away from the generator and the orientation of the readings in the vertical direction may be pointing toward the base. Overall sound pressure levels (SPLs) may be acquired using the above-mentioned hand-held precision acoustic sound meter.

The system and process of the above-described embodiment of the present invention may be implemented as part of an expert system for the predictive maintenance of mechanical systems. Generally speaking, these expert systems analyze various parameters and noise signatures to determine prior to a breakdown when a repair to a particular component of the mechanical system should be made.

The output of a consistent "noise index number" may be used to create an industry standard of generator harmonic noise levels. In the future, harmonic noise levels (Harmonic Index Numbers) could also be incorporated into Occupational Safety & Health Administration (OSHA) specifications.

Although the invention is described above in terms of a data acquisition system and a separate computing device for data processing, it will be appreciated that the invention may be implemented by an integrated system that performs both data acquisition and data processing. The data processing program may conveniently be provided as part of the functionality of an application specific integrated circuit (ASIC) in this integrated system or in other systems (both integrated and non-integrated) that implement the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX I

The Excel spreadsheet macro is as follows:

```
Sub Clear( )
   Dim ClearRange As Object
   Set ClearRange=Range(Cells(13, 1), Cells(100, 12))
   ClearRange.ClearContents
End Sub
Sub Calc( )
   Freq=Cells(8, 11).Value
```

```
If Freq=0 Then
    Freq=60
End If
    FreqIncr=Cells(14, 2)−Cells(13, 2)
        Range(Cells(13, 2), Ceils(413, 8))AutoFormat
        For I=13 To 413
    Cells(I, 1)=I−12
HarmNumber=Ceils(I, 2).Value\60
    BaseOffset=13−(Harmnumber* 60+Freq\2)\FreqIncr
        Cells(I, 4).Value=ApplicationAkverage(Range(Cells
            (BaseOffset−2, 3),
Cells(BaseOffset+2, 3)))
    Cells(I, 5).Value=Cells(I, 3).Value−Cells(I, 4).Value
    If ((Cells(I, 2).Value Mod (Freq* 2))=0) Then
    Cells(I, 6).Value=Cells(I, 5).Value
    End If
    If ((Cells(I, 2).Value Mod (Freq* 4))=0) Then
    Cells(I, 7).Value=Cells(I, 5).Value
    End If
    If ((Cells(I, 2).Value Mod (Freq* 2))=0) Then
    Cells(I, 8).Value=Cells(I, 6).Value−Cells(I, 7).Value
    End If
    Next
    Cells(13, 10)=Application.Sum(Range(Cells(13, 7),
        Cells(2000, 7)))
Cells(13, 11)=Application.Sum(Range(Cells(13, 8), Cells
    (2000, 8)))
Cells(13, 12)=Application.Sum(Range(Cells(13, 6), Cells
    (2000, 6)))
End Sub
```

APPENDIX II

| Bin # | Frequency | Amplitude dB | Noise Base dB | dB Ratio | 120 Mult. | Even Mult. | Odd Mult |
|---|---|---|---|---|---|---|---|
| 1 | 0.00E + 00 | 3.85E + 01 | 36.48 | 1.98 | 1.98 | 1.98 | 0.00 |
| 2 | 5.00E + 00 | 2.93E + 01 | 36.48 | −7.18 | | | |
| 3 | 1.00E + 01 | 3.10E + 01 | 36.48 | −5.49 | | | |
| 4 | 1.50E + 01 | 3.19E + 01 | 36.48 | −4.58 | | | |
| 5 | 2.00E + 01 | 3.55E + 01 | 36.48 | −1.00 | | | |
| 6 | 2.50E + 01 | 3.50E + 01 | 36.48 | −1.53 | | | |
| 7 | 3.00E + 01 | 3.69E + 01 | 36.48 | 0.39 | | | |
| 8 | 3.50E + 01 | 3.74E + 01 | 36.48 | 0.97 | | | |
| 9 | 4.00E + 01 | 3.77E + 01 | 36.48 | 1.18 | | | |
| 10 | 4.50E + 01 | 3.80E + 01 | 36.48 | 1.55 | | | |
| 11 | 5.00E + 01 | 3.87E + 01 | 36.48 | 2.26 | | | |
| 12 | 5.50E + 01 | 4.03E + 01 | 36.48 | 3.86 | | | |
| 13 | 6.00E + 01 | 4.97E + 01 | 41.61 | 8.13 | | | |
| 14 | 6.50E + 01 | 3.59E + 01 | 41.61 | −5.68 | | | |
| 15 | 7.00E + 01 | 3.98E + 01 | 41.61 | −1.81 | | | |
| 16 | 7.50E + 01 | 4.12E + 01 | 41.61 | −0.41 | | | |
| 17 | 8.00E + 01 | 3.95E + 01 | 41.61 | −2.13 | | | |
| 18 | 8.50E + 01 | 4.21E + 01 | 41.61 | 0.45 | | | |
| 19 | 9.00E + 01 | 4.27E + 01 | 41.61 | 1.07 | | | |
| 20 | 9.50E + 01 | 4.07E + 01 | 41.61 | −0.90 | | | |
| 21 | 1.00E + 02 | 4.31E + 01 | 41.61 | 1.51 | | | |
| 22 | 1.05E + 02 | 4.42E + 01 | 41.61 | 2.57 | | | |
| 23 | 1.10E + 02 | 4.74E + 01 | 41.61 | 5.79 | | | |
| 24 | 1.15E + 02 | 5.64E + 01 | 41.61 | 14.75 | | | |
| 25 | 1.20E + 02 | 6.46E + 01 | 42.86 | 21.70 | 21.70 | | 21.70 |
| 26 | 1.25E + 02 | 4.69E + 01 | 42.86 | 3.99 | | | |
| 27 | 1.30E + 02 | 4.68E + 01 | 42.86 | 3.90 | | | |
| 28 | 1.35E + 02 | 4.21E + 01 | 42.86 | −0.80 | | | |
| 29 | 1.40E + 02 | 4.18E + 01 | 42.86 | −1.05 | | | |
| 30 | 1.45E + 02 | 4.36E + 01 | 42.86 | 0.74 | | | |
| 31 | 1.50E + 02 | 4.44E + 01 | 42.86 | 1.50 | | | |
| 32 | 1.55E + 02 | 4.20E + 01 | 42.86 | −0.87 | | | |
| 33 | 1.60E + 02 | 4.25E + 01 | 42.86 | −0.32 | | | |
| 34 | 1.65E + 02 | 4.20E + 01 | 42.86 | −0.83 | | | |
| 35 | 1.70E + 02 | 4.11E + 01 | 42.86 | −1.78 | | | |
| 36 | 1.75E + 02 | 4.05E + 01 | 42.86 | −2.37 | | | |

APPENDIX II-continued

| Bin # | Frequency | Amplitude dB | Noise Base dB | dB Ratio | 120 Mult. | Even Mult. | Odd Mult |
|---|---|---|---|---|---|---|---|
| 37 | 1.80E + 02 | 4.46E + 01 | 41.28 | 3.28 | | | |
| 38 | 1.85E + 02 | 4.25E + 01 | 41.28 | 1.20 | | | |
| 39 | 1.90E + 02 | 4.19E + 01 | 41.28 | 0.60 | | | |
| 40 | 1.95E + 02 | 3.86E + 01 | 41.28 | −2.65 | | | |
| 41 | 2.00E + 02 | 3.98E + 01 | 41.28 | −1.46 | | | |
| 42 | 2.05E + 02 | 4.21E + 01 | 41.28 | 0.81 | | | |
| 43 | 2.10E + 02 | 4.22E + 01 | 41.28 | 0.88 | | | |
| 44 | 2.15E + 02 | 4.22E + 01 | 41.28 | 0.90 | | | |
| 45 | 2.20E + 02 | 4.02E + 01 | 41.28 | −1.12 | | | |
| 46 | 2.25E + 02 | 4.21E + 01 | 41.28 | 0.79 | | | |
| 47 | 2.30E + 02 | 4.34E + 01 | 41.28 | 2.13 | | | |
| 48 | 2.35E + 02 | 5.44E + 01 | 41.28 | 13.10 | | | |
| 49 | 2.40E + 02 | 4.96E + 01 | 42.94 | 6.64 | 6.64 | 6.64 | 0.00 |
| 50 | 2.45E + 02 | 4.18E + 01 | 42.94 | −1.18 | | | |
| 51 | 2.50E + 02 | 4.24E + 01 | 42.94 | 0.54 | | | |
| 52 | 2.55E + 02 | 4.40E + 01 | 42.94 | 1.02 | | | |
| 53 | 2.60E + 02 | 4.21E + 01 | 42.94 | −0.80 | | | |
| 54 | 2.65E + 02 | 4.54E + 01 | 42.94 | 2.46 | | | |
| 55 | 2.70E + 02 | 4.40E + 01 | 42.94 | 1.11 | | | |
| 56 | 2.75E + 02 | 4.39E + 01 | 42.94 | 1.00 | | | |
| 57 | 2.80E + 02 | 3.92E + 01 | 42.94 | −3.77 | | | |
| 58 | 2.85E + 02 | 4.46E + 01 | 42.94 | 1.67 | | | |
| 59 | 2.90E + 02 | 4.24E + 01 | 42.94 | 0.52 | | | |
| 60 | 2.95E + 02 | 4.48E + 01 | 42.94 | 1.86 | | | |
| 61 | 3.00E + 02 | 4.26E + 01 | 42.37 | 0.25 | | | |
| 62 | 3.05E + 02 | 4.39E + 01 | 42.37 | 1.53 | | | |
| 63 | 3.10E + 02 | 4.41E + 01 | 42.37 | 1.70 | | | |
| 64 | 3.15E + 02 | 3.95E + 01 | 42.37 | −2.85 | | | |
| 65 | 3.20E + 02 | 4.17E + 01 | 42.37 | −0.71 | | | |
| 66 | 3.25E + 02 | 4.22E + 01 | 42.37 | 0.18 | | | |
| 67 | 3.30E + 02 | 4.04E + 01 | 42.37 | −1.96 | | | |
| 68 | 3.35E + 02 | 4.35E + 01 | 42.37 | 1.10 | | | |
| 69 | 3.40E + 02 | 441E + 01 | 42.37 | 1.75 | | | |
| 70 | 3.45E + 02 | 4.48E + 01 | 42.37 | 2.41 | | | |
| 71 | 3.50E + 02 | 4.91E + 01 | 42.37 | 6.71 | | | |
| 72 | 3.55E + 02 | 4.87E + 01 | 42.37 | 6.38 | | | |
| 73 | 3.60E + 02 | 5.27E + 01 | 43.03 | 9.69 | 9.69 | 9.69 | |
| 74 | 3.65E + 02 | 4.45E + 01 | 43.03 | 1.43 | | | |
| 75 | 3.70E + 02 | 4.35E + 01 | 43.03 | 0.43 | | | |
| 76 | 3.75E + 02 | 4.43E + 01 | 43.03 | 1.23 | | | |
| 77 | 3.80E + 02 | 4.68E + 01 | 43.03 | 3.75 | | | |
| 78 | 3.85E + 02 | 4.20E + 01 | 43.03 | −1.08 | | | |
| 79 | 3.90E + 02 | 4.21E + 01 | 43.03 | −0.95 | | | |
| 80 | 3.95E + 02 | 4.29E + 01 | 43.03 | −0.15 | | | |
| 81 | 4.00E + 02 | 4.15E + 01 | 43.03 | −1.57 | | | |
| 82 | 4.05E + 02 | 4.12E + 01 | 43.03 | −1.79 | | | |
| 83 | 4.10E + 02 | 4.13E + 01 | 43.03 | −1.75 | | | |
| 84 | 4.15E + 02 | 4.28E + 01 | 43.03 | −0.24 | | | |
| 85 | 4.20E + 02 | 4.92E + 01 | 43.22 | 6.03 | | | |
| 86 | 4.25E + 02 | 3.81E + 01 | 43.22 | −5.07 | | | |
| 87 | 4.30E + 02 | 4.01E + 01 | 43.22 | −3.13 | | | |
| 88 | 4.35E + 02 | 4.01E + 01 | 43.22 | −3.11 | | | |
| 89 | 4.40E + 02 | 4.33E + 01 | 43.22 | 0.07 | | | |
| 90 | 4.45E + 02 | 4.19E + 01 | 43.22 | −1.31 | | | |
| 91 | 4.50E + 02 | 4.34E + 01 | 43.22 | 0.17 | | | |
| 92 | 4.55E + 02 | 4.19E + 01 | 43.22 | −1.33 | | | |
| 93 | 4.60E + 02 | 4.56E + 01 | 43.22 | 2.40 | | | |
| 94 | 4.65E + 02 | 4.60E + 01 | 43.22 | 3.37 | | | |
| 95 | 4.70E + 02 | 5.24E + 01 | 43.22 | 9.21 | | | |
| 96 | 4.75E + 02 | 4.46E + 01 | 43.22 | 1.36 | | | |
| 97 | 4.80E + 02 | 5.78E + 01 | 43.89 | 13.91 | 13.91 | 13.91 | 0.00 |
| 98 | 4.85E + 02 | 4.40E + 01 | 43.89 | 0.13 | | | |
| 99 | 4.90E + 02 | 4.46E + 01 | 43.89 | 0.70 | | | |
| 100 | 4.95E + 02 | 4.15E + 01 | 43.89 | −2.38 | | | |
| 101 | 5.00E + 02 | 4.52E + 01 | 43.89 | 1.35 | | | |
| 102 | 5.05E + 02 | 4.41E + 01 | 43.89 | 0.24 | | | |
| 103 | 5.10E + 02 | 4.56E + 01 | 43.89 | 1.70 | | | |
| 104 | 5.15E + 02 | 4.10E + 01 | 43.89 | −2.89 | | | |
| 105 | 5.20E + 02 | 4.35E + 01 | 43.89 | 0.40 | | | |
| 106 | 5.25E + 02 | 4.50E + 01 | 43.89 | 1.09 | | | |
| 107 | 5.30E + 02 | 4.67E + 01 | 43.89 | 2.79 | | | |
| 108 | 5.35E + 02 | 4.61E + 01 | 43.89 | 2.24 | | | |
| 109 | 5.40E + 02 | 4.85E + 01 | 43.13 | 5.35 | | | |
| 110 | 5.45E + 02 | 4.45E + 01 | 43.13 | 1.40 | | | |
| 111 | 5.50E + 02 | 4.47E + 01 | 43.13 | 1.54 | | | |
| 112 | 5.55E + 02 | 4.53E + 01 | 43.13 | 2.16 | | | |

APPENDIX II-continued

| Bin # | Frequency | Amplitude dB | Noise Base dB | dB Ratio | 120 Mult. | Even Mult. | Odd Mult |
|---|---|---|---|---|---|---|---|
| 113 | 5.60E + 02 | 4.40E + 01 | 43.13 | 0.86 | | | |
| 114 | 5.65E + 02 | 4.21E + 01 | 43.13 | −1.03 | | | |
| 115 | 5.70E + 02 | 4.22E + 01 | 43.13 | −0.93 | | | |
| 116 | 5.75E + 02 | 4.41E + 01 | 43.13 | 0.93 | | | |
| 117 | 5.80E + 02 | 4.33E + 01 | 43.13 | 0.17 | | | |
| 118 | 5.85E + 02 | 4.43E + 01 | 43.13 | 1.15 | | | |
| 119 | 5.90E + 02 | 4.40E + 01 | 43.13 | 0.83 | | | |
| 120 | 5.95E + 02 | 4.54E + 01 | 43.13 | 2.31 | | | |
| 121 | 6.00E + 02 | 6.06E + 01 | 45.27 | 15.33 | 15.33 | | 15.33 |
| 122 | 6.05E + 02 | 4.48E + 01 | 45.27 | −0.47 | | | |
| 123 | 6.10E + 02 | 4.54E + 01 | 45.27 | 0.16 | | | |
| 124 | 6.15E + 02 | 4.81E + 01 | 45.27 | 2.79 | | | |
| 125 | 6.20E + 02 | 4.44E + 01 | 45.27 | −0.87 | | | |
| 126 | 6.25E + 02 | 4.70E + 01 | 45.27 | 1.68 | | | |
| 127 | 6.30E + 02 | 4.62E + 01 | 45.27 | 0.93 | | | |
| 128 | 6.35E + 02 | 4.49E + 01 | 45.27 | −0.41 | | | |
| 129 | 6.40E + 02 | 4.39E + 01 | 45.27 | −1.33 | | | |
| 130 | 6.45E + 02 | 4.57E + 01 | 45.27 | 0.40 | | | |
| 131 | 6.50E + 02 | 4.40E + 01 | 45.27 | −1.25 | | | |
| 132 | 6.55E + 02 | 4.35E + 01 | 45.27 | −1.82 | | | |
| 133 | 6.60E + 02 | 4.73E + 01 | 44.53 | 2.79 | | | |
| 134 | 6.65E + 02 | 4.53E + 01 | 44.53 | 0.80 | | | |
| 135 | 6.70E + 02 | 4.54E + 01 | 44.53 | 0.92 | | | |
| 136 | 6.75E + 02 | 4.41E + 01 | 44.53 | −0.42 | | | |
| 137 | 6.80E + 02 | 4.49E + 01 | 44.53 | 0.33 | | | |
| 138 | 6.85E + 02 | 4.22E + 01 | 44.53 | −2.36 | | | |
| 139 | 6.90E + 02 | 4.61E + 01 | 44.53 | 1.57 | | | |
| 140 | 6.95E + 02 | 4.48E + 01 | 44.53 | 0.26 | | | |
| 141 | 7.00E + 02 | 4.47E + 01 | 44.53 | 0.21 | | | |
| 142 | 7.05E + 02 | 4.67E + 01 | 44.53 | 2.20 | | | |
| 143 | 7.10E + 02 | 4.45E + 01 | 44.53 | −0.03 | | | |
| 144 | 7.15E + 02 | 4.04E + 01 | 44.53 | −4.15 | | | |
| 145 | 7.20E + 02 | 6.03E + 01 | 44.03 | 16.29 | 16.29 | 16.29 | 0.00 |
| 146 | 7.25E + 02 | 4.39E + 01 | 44.03 | −0.17 | | | |
| 147 | 7.30E + 02 | 4.28E + 01 | 44.03 | −1.27 | | | |
| 148 | 7.35E + 02 | 4.32E + 01 | 44.03 | −0.85 | | | |
| 149 | 7.40E + 02 | 4.33E + 01 | 44.03 | −0.78 | | | |
| 150 | 7.45E + 02 | 4.34E + 01 | 44.03 | −0.67 | | | |
| 151 | 7.50E + 02 | 4.63E + 01 | 44.03 | 2.28 | | | |
| 152 | 7.55E + 02 | 4.39E + 01 | 44.03 | −0.15 | | | |
| 153 | 7.60E + 02 | 4.33E + 01 | 44.03 | −0.69 | | | |
| 154 | 7.65E + 02 | 4.66E + 01 | 44.03 | 2.61 | | | |
| 155 | 7.70E + 02 | 4.69E + 01 | 44.03 | 2.87 | | | |
| 156 | 7.75E + 02 | 4.52E + 01 | 44.03 | 1.19 | | | |
| 157 | 7.80E + 02 | 4.90E + 01 | 44.52 | 4.47 | | | |
| 158 | 7.85E + 02 | 4.42E + 01 | 44.52 | −0.31 | | | |
| 159 | 7.90E + 02 | 4.45E + 01 | 44.52 | 0.01 | | | |
| 160 | 7.95E + 02 | 4.54E + 01 | 44.52 | 0.89 | | | |
| 161 | 8.00E + 02 | 4.31E + 01 | 44.52 | −1.39 | | | |
| 162 | 8.05E + 02 | 4.71E + 01 | 44.52 | 2.63 | | | |
| 163 | 8.10E + 02 | 4.52E + 01 | 44.52 | 0.69 | | | |
| 164 | 8.15E + 02 | 4.31E + 01 | 44.52 | −1.44 | | | |
| 165 | 8.20E + 02 | 4.40E + 01 | 44.52 | −0.49 | | | |
| 166 | 8.25E + 02 | 4.38E + 01 | 44.52 | −0.76 | | | |
| 167 | 8.30E + 02 | 4.54E + 01 | 44.52 | 0.91 | | | |
| 168 | 8.35E + 02 | 4.57E + 01 | 44.52 | 1.14 | | | |
| 169 | 8.40E + 02 | 5.41E + 01 | 44.68 | 9.46 | 9.46 | | 9.46 |
| 170 | 8.45E + 02 | 4.47E + 01 | 44.68 | 0.04 | | | |
| 171 | 8.50E + 02 | 4.4aE + 01 | 44.68 | −0.65 | | | |
| 172 | 8.55E + 02 | 4.31E + 01 | 44.68 | −1.59 | | | |
| 173 | 8.60E + 02 | 4.46E + 01 | 44.68 | −0.04 | | | |
| 174 | 8.65E + 02 | 4.70E + 01 | 44.68 | 2.31 | | | |
| 175 | 8.70E + 02 | 4.41E + 01 | 44.68 | −0.55 | | | |
| 176 | 8.75E + 02 | 4.27E + 01 | 44.68 | −1.99 | | | |
| 177 | 8.80E + 02 | 4.50E + 01 | 44.68 | 0.28 | | | |
| 178 | 8.85E + 02 | 4.57E + 01 | 44.68 | 0.98 | | | |
| 179 | 8.90E + 02 | 4.33E + 01 | 44.68 | −1.40 | | | |
| 180 | 8.95E + 02 | 4.60E + 01 | 44.68 | 1.32 | | | |
| 181 | 9.00E + 02 | 4.63E + 01 | 44.11 | 2.22 | | | |
| 182 | 9.05E + 02 | 4.47E + 01 | 44.11 | 0.59 | | | |
| 183 | 9.10E + 02 | 4.59E + 01 | 44.11 | 1.76 | | | |
| 184 | 9.15E + 02 | 4.63E + 01 | 44.11 | 2.14 | | | |
| 185 | 9.20E + 02 | 4.43E + 01 | 44.11 | 0.16 | | | |
| 186 | 9.25E + 02 | 4.19E + 01 | 44.11 | −2.18 | | | |
| 187 | 9.30E + 02 | 4.49E + 01 | 44.11 | 0.78 | | | |
| 188 | 9.35E + 02 | 4.38E + 01 | 44.11 | −0.34 | | | |
| 189 | 9.40E + 02 | 4.57E + 01 | 44.11 | 1.59 | | | |
| 190 | 9.45E + 02 | 4.40E + 01 | 44.11 | −0.14 | | | |
| 191 | 9.50E + 02 | 4.47E + 01 | 44.11 | 0.62 | | | |
| 192 | 9.55E + 02 | 4.36E + 01 | 44.11 | −0.49 | | | |
| 193 | 9.60E + 02 | 5.50E + 01 | 44.34 | 10.67 | 10.67 | 10.67 | 0.00 |
| 194 | 9.65E + 02 | 4.38E + 01 | 44.34 | −0.50 | | | |
| 195 | 9.70E + 02 | 4.27E + 01 | 44.34 | −1.68 | | | |
| 196 | 9.75E + 02 | 4.50E + 01 | 44.34 | 0.66 | | | |
| 197 | 9.B0E + 02 | 4.34E + 01 | 44.34 | −0.93 | | | |
| 198 | 9.85E + 02 | 4.36E + 01 | 44.34 | −0.78 | | | |
| 199 | 9.90E + 02 | 4.46E + 01 | 44.34 | 0.24 | | | |
| 200 | 9.95E + 02 | 4.53E + 01 | 44.34 | 0.95 | | | |
| 201 | 1.00E + 03 | 4.49E + 01 | 44.34 | 0.52 | | | |
| 202 | 1.01E + 03 | 4.39E + 01 | 44.34 | −0.47 | | | |
| 203 | 1.01E + 03 | 4.45E + 01 | 44.34 | 0.11 | | | |
| 204 | 1.02E + 03 | 4.47E + 01 | 44.34 | 0.37 | | | |
| 205 | 1.02E + 03 | 4.35E + 01 | 44.57 | −1.10 | | | |
| 206 | 1.03E + 03 | 4.35E + 01 | 44.57 | −1.08 | | | |
| 207 | 1.03E + 03 | 4.42E + 01 | 44.57 | −0.32 | | | |
| 208 | 1.04E + 03 | 4.41E + 01 | 44.57 | −0.45 | | | |
| 209 | 1.04E + 03 | 4.34E + 01 | 44.57 | −1.14 | | | |
| 210 | 1.05E + 03 | 4.44E + 01 | 44.57 | −0.13 | | | |
| 211 | 1.05E + 03 | 4.57E + 01 | 44.57 | 1.10 | | | |
| 212 | 1.06E + 03 | 4.46E + 01 | 44.57 | 0.01 | | | |
| 213 | 1.06E + 03 | 4.47E + 01 | 44.57 | 0.16 | | | |
| 214 | 1.07E + 03 | 4.52E + 01 | 44.57 | 0.62 | | | |
| 215 | 1.07E + 03 | 4.46E + 01 | 44.57 | 0.07 | | | |
| 216 | 1.08E + 03 | 4.52E + 01 | 44.57 | 0.59 | | | |
| 217 | 1.08E + 03 | 4.98E + 01 | 44.90 | 4.89 | | 4.89 | 4.89 |
| 218 | 1.09E + 03 | 4.27E + 01 | 44.90 | −2.25 | | | |
| 219 | 1.09E + 03 | 4.45E + 01 | 44.90 | −0.36 | | | |
| 220 | 1.10E + 03 | 4.72E + 01 | 44.90 | 2.25 | | | |
| 221 | 1.10E + 03 | 4.59E + 01 | 44.90 | 1.03 | | | |
| 222 | 1.11E + 03 | 4.69E + 01 | 44.90 | 1.96 | | | |
| 223 | 1.11E + 03 | 4.42E + 01 | 44.90 | −0.74 | | | |
| 224 | 1.12E + 03 | 4.57E + 01 | 44.90 | 0.81 | | | |
| 225 | 1.12E + 03 | 4.19E + 01 | 44.90 | −3.05 | | | |
| 226 | 1.13E + 03 | 4.52E + 01 | 44.90 | 0.26 | | | |
| 227 | 1.13E + 03 | 4.35E + 01 | 44.90 | −1.44 | | | |
| 228 | 1.14E + 03 | 4.47E + 01 | 44.90 | −0.18 | | | |
| 229 | 1.14E + 03 | 4.70E + 01 | 45.87 | 1.11 | | | |
| 230 | 1.15E + 03 | 4.55E + 01 | 45.87 | −0.38 | | | |
| 231 | 1.15E + 03 | 4.33E + 01 | 45.87 | −2.53 | | | |
| 232 | 1.16E + 03 | 4.32E + 01 | 45.87 | −2.65 | | | |
| 233 | 1.16E + 03 | 4.42E + 01 | 45.87 | −1.66 | | | |
| 234 | 1.17E + 03 | 4.72E + 01 | 45.87 | 1.31 | | | |
| 235 | 1.17E + 03 | 4.65E + 01 | 45.87 | 0.68 | | | |
| 236 | 1.18E + 03 | 4.75E + 01 | 45.87 | 1.61 | | | |
| 237 | 1.18E + 03 | 4.39E + 01 | 45.87 | −1.94 | | | |
| 238 | 1.19E + 03 | 4.68E + 01 | 45.87 | 0.89 | | | |
| 239 | 1.19E + 03 | 4.73E + 01 | 45.87 | 1.42 | | | |
| 240 | 1.20E + 03 | 4.64E + 01 | 45.87 | 0.50 | | | |
| 241 | 1.20E + 03 | 5.17E + 01 | 45.52 | 6.17 | 6.17 | 6.17 | 0.00 |
| 242 | 1.21E + 03 | 4.52E + 01 | 45.52 | −0.36 | | | |
| 243 | 1.21E + 03 | 4.41E + 01 | 45.52 | −1.46 | | | |
| 244 | 1.22E + 03 | 4.23E + 01 | 45.52 | −3.24 | | | |
| 245 | 1.22E + 03 | 4.57E + 01 | 45.52 | 0.20 | | | |
| 246 | 1.23E + 03 | 4.71E + 01 | 45.52 | 1.55 | | | |
| 247 | 1.23E + 03 | 4.50E + 01 | 45.52 | −0.57 | | | |
| 248 | 1.24E + 03 | 4.53E + 01 | 45.52 | −0.20 | | | |
| 249 | 1.24E + 03 | 4.45E + 01 | 45.52 | −0.98 | | | |
| 250 | 1.25E + 03 | 4.32E + 01 | 45.52 | −2.35 | | | |
| 251 | 1.25E + 03 | 4.50E + 01 | 45.52 | 0.50 | | | |
| 252 | 1.26E + 03 | 4.67E + 01 | 45.52 | 1.15 | | | |
| 253 | 1.26E + 03 | 4.89E + 01 | 46.36 | 2.55 | | | |
| 254 | 1.27E + 03 | 4.62E + 01 | 46.36 | −0.18 | | | |
| 255 | 1.27E + 03 | 4.57E + 01 | 46.36 | −0.66 | | | |
| 256 | 1.28E + 03 | 4.95E + 01 | 46.36 | 3.12 | | | |
| 257 | 1.28E + 03 | 4.81E + 01 | 46.36 | 1.75 | | | |
| 258 | 1.29E + 03 | 4.52E + 01 | 46.36 | −1.12 | | | |
| 259 | 1.29E + 03 | 4.70E + 01 | 46.36 | 0.60 | | | |
| 260 | 1.30E + 03 | 4.75E + 01 | 46.36 | 1.18 | | | |
| 261 | 1.30E + 03 | 4.39E + 01 | 46.36 | −2.42 | | | |
| 262 | 1.31E + 03 | 4.27E + 01 | 46.36 | −3.63 | | | |
| 263 | 1.31E + 03 | 4.59E + 01 | 46.36 | −0.47 | | | |
| 264 | 1.32E + 03 | 4.46E + 01 | 46.36 | −1.72 | | | |

APPENDIX II-continued

| Bin # | Frequency | Amplitude dB | Noise Base dB | dB Ratio | 120 Mult. | Even Mult. | Odd Mult |
|---|---|---|---|---|---|---|---|
| 265 | 1.32E + 03 | 5.66E + 01 | 47.92 | 8.72 | 8.72 | | 8.72 |
| 266 | 1.33E + 03 | 4.70E + 01 | 47.92 | −0.94 | | | |
| 267 | 1.33E + 03 | 4.87E + 01 | 47.92 | 0.78 | | | |
| 268 | 1.34E + 03 | 4.52E + 01 | 47.92 | −2.72 | | | |
| 269 | 1.34E + 03 | 4.73E + 01 | 47.92 | −0.65 | | | |
| 270 | 1.35E + 03 | 4.74E + 01 | 47.92 | −0.51 | | | |
| 271 | 1.35E + 03 | 4.96E + 01 | 47.92 | 1.72 | | | |
| 272 | 1.36E + 03 | 4.80E + 01 | 47.92 | 0.09 | | | |
| 273 | 1.36E + 03 | 4.73E + 01 | 47.92 | −0.65 | | | |
| 274 | 1.37E + 03 | 4.87E + 01 | 47.92 | 0.82 | | | |
| 275 | 1.37E + 03 | 4.89E + 01 | 47.92 | 0.97 | | | |
| 276 | 1.38E + 03 | 4.92E + 01 | 47.92 | 1.23 | | | |
| 277 | 1.38E + 03 | 4.92E + 01 | 48.07 | 1.17 | | | |
| 278 | 1.39E + 03 | 5.01E + 01 | 48.07 | 2.04 | | | |
| 279 | 1.39E + 03 | 5.07E + 01 | 48.07 | 2.67 | | | |
| 280 | 1.40E + 03 | 5.16E + 01 | 48.07 | 3.73 | | | |
| 281 | 1.40E + 03 | 4.75E + 01 | 48.07 | −0.56 | | | |
| 252 | 1.41E + 03 | 4.89E + 01 | 48.07 | 0.85 | | | |
| 283 | 1.41E + 03 | 4.85E + 01 | 48.07 | 0.45 | | | |
| 284 | 1.42E + 03 | 4.74E + 01 | 48.07 | −0.66 | | | |
| 285 | 1.42E + 03 | 4.80E + 01 | 48.07 | −0.08 | | | |
| 286 | 1.43E + 03 | 4.98E + 01 | 48.07 | 1.77 | | | |
| 287 | 1.43E + 03 | 4.91E + 01 | 48.07 | 1.05 | | | |
| 288 | 1.44E + 03 | 4.88E + 01 | 48.07 | 0.71 | | | |
| 289 | 1.44E + 03 | 5.33E + 01 | 47.55 | 5.78 | 5.78 | 5.78 | 0.00 |
| 290 | 1.45E + 03 | 5.24E + 01 | 47.55 | 4.83 | | | |
| 291 | 1.45E + 03 | 5.23E + 01 | 47.55 | 4.75 | | | |
| 292 | 1.46E + 03 | 5.14E + 01 | 47.55 | 3.86 | | | |
| 293 | 1.46E + 03 | 5.06E + 01 | 47.55 | 3.09 | | | |
| 294 | 1.47E + 03 | 4.78E + 01 | 47.55 | 0.29 | | | |
| 295 | 1.47E + 03 | 4.67E + 01 | 47.55 | −0.89 | | | |
| 296 | 1.48E + 03 | 4.56E + 01 | 47.55 | −1.95 | | | |
| 297 | 1.48E + 03 | 4.70E + 01 | 47.55 | −0.54 | | | |
| 298 | 1.49E + 03 | 4.75E + 01 | 47.55 | −0.05 | | | |
| 299 | 1.49E + 03 | 4.68E + 01 | 47.55 | 0.76 | | | |
| 300 | 1.50E + 03 | 4.92E + 01 | 47.55 | 1.69 | | | |
| 301 | 1.50E + 03 | 5.10E + 01 | 47.37 | 3.68 | | | |
| 302 | 1.51E + 03 | 4.82E + 01 | 47.37 | 0.83 | | | |
| 303 | 1.51E + 03 | 4.86E + 01 | 47.37 | 1.26 | | | |
| 304 | 1.52E + 03 | 4.85E + 01 | 47.37 | 1.13 | | | |
| 305 | 1.52E + 03 | 4.71E + 01 | 47.37 | −0.31 | | | |
| 306 | 1.53E + 03 | 4.65E + 01 | 47.37 | −0.88 | | | |
| 307 | 1.53E + 03 | 4.92E + 01 | 47.37 | 1.88 | | | |
| 308 | 1.54E + 03 | 4.80E + 01 | 47.37 | 0.58 | | | |
| 309 | 1.54E + 03 | 4.61E + 01 | 47.37 | −1.28 | | | |
| 310 | 1.55E + 03 | 4.68E + 01 | 47.37 | −0.53 | | | |
| 311 | 1.55E + 03 | 4.69E + 01 | 47.37 | −0.45 | | | |
| 312 | 1.56E + 03 | 4.78E + 01 | 47.37 | 0.46 | | | |
| 313 | 1.56E + 03 | 4.55E + 01 | 47.68 | −2.13 | −2.13 | | −2.13 |
| 314 | 1.57E + 03 | 4.60E + 01 | 47.68 | −1.70 | | | |
| 315 | 1.57E + 03 | 4.80E + 01 | 47.68 | 0.35 | | | |
| 316 | 1.58E + 03 | 4.90E + 01 | 47.68 | 1.35 | | | |
| 317 | 1.58E + 03 | 5.05E + 01 | 47.68 | 2.84 | | | |
| 318 | 1.59E + 03 | 4.73E + 01 | 47.68 | −0.39 | | | |
| 319 | 1.59E + 03 | 4.71E + 01 | 47.68 | −0.53 | | | |
| 320 | 1.60E + 03 | 4.68E + 01 | 47.68 | −0.88 | | | |
| 321 | 1.60E + 03 | 4.66E + 01 | 47.68 | −1.03 | | | |
| 322 | 1.61E + 03 | 4.65E + 01 | 47.68 | −1.18 | | | |
| 323 | 1.61E + 03 | 4.90E + 01 | 47.68 | 1.28 | | | |
| 324 | 1.62E + 03 | 4.73E + 01 | 47.68 | −0.41 | | | |
| 325 | 1.62E + 03 | 4.90E + 01 | 46.89 | 2.08 | | | |
| 326 | 1.63E + 03 | 4.66E + 01 | 46.89 | −0.32 | | | |
| 327 | 1.63E + 03 | 4.80E + 01 | 46.89 | 1.08 | | | |
| 328 | 1.64E + 03 | 4.92E + 01 | 46.89 | 2.30 | | | |
| 329 | 1.64E + 03 | 4.79E + 01 | 46.89 | 1.06 | | | |
| 330 | 1.65E + 03 | 4.59E + 01 | 46.89 | −0.97 | | | |
| 331 | 1.65E + 03 | 4.59E + 01 | 46.89 | −0.96 | | | |
| 332 | 1.66E + 03 | 4.73E + 01 | 46.89 | 0.46 | | | |
| 333 | 1.66E + 03 | 4.73E + 01 | 46.89 | 0.40 | | | |
| 334 | 1.67E + 03 | 4.77E + 01 | 46.89 | 0.84 | | | |
| 335 | 1.67E + 03 | 4.69E + 01 | 46.89 | 0.04 | | | |
| 336 | 1.68E + 03 | 4.88E + 01 | 46.89 | 1.89 | | | |
| 337 | 1.68E + 03 | 4.63E + 01 | 47.76 | −1.50 | −1.50 | −1.50 | 0.00 |
| 338 | 1.69E + 03 | 5.08E + 01 | 47.76 | 3.08 | | | |
| 339 | 1.69E + 03 | 4.77E + 01 | 47.76 | −0.05 | | | |
| 340 | 1.70E + 03 | 4.91E + 01 | 47.76 | 1.34 | | | |
| 341 | 1.70E + 03 | 4.80E + 01 | 47.76 | 0.20 | | | |
| 342 | 1.71E + 03 | 4.62E + 01 | 47.76 | −1.54 | | | |
| 343 | 1.71E + 03 | 4.87E + 01 | 47.76 | 0.96 | | | |
| 344 | 1.72E + 03 | 4.91E + 01 | 47.76 | 1.29 | | | |
| 345 | 1.72E + 03 | 4.68E + 01 | 47.76 | −0.91 | | | |
| 346 | 1.73E + 03 | 4.72E + 01 | 47.76 | −0.61 | | | |
| 347 | 1.73E + 03 | 4.73E + 01 | 47.76 | −0.49 | | | |
| 348 | 1.74E + 03 | 4.82E + 01 | 47.76 | 0.40 | | | |
| 349 | 1.74E + 03 | 4.78E + 01 | 48.11 | −0.33 | | | |
| 350 | 1.75E + 03 | 4.80E + 01 | 48.11 | −0.15 | | | |
| 351 | 1.75E + 03 | 4.86E + 01 | 48.11 | 0.54 | | | |
| 352 | 1.76E + 03 | 4.89E + 01 | 48.11 | 0.76 | | | |
| 353 | 1.76E + 03 | 4.86E + 01 | 48.11 | 0.50 | | | |
| 354 | 1.77E + 03 | 4.77E + 01 | 48.11 | −0.42 | | | |
| 355 | 1.77E + 03 | 4.86E + 01 | 48.11 | 0.53 | | | |
| 356 | 1.78E + 03 | 4.86E + 01 | 48.11 | 0.44 | | | |
| 357 | 1.78E + 03 | 4.71E + 01 | 48.11 | −1.05 | | | |
| 358 | 1.79E + 03 | 4.91E + 01 | 48.11 | 0.96 | | | |
| 359 | 1.79E + 03 | 4.71E + 01 | 48.11 | −1.03 | | | |
| 360 | 1.80E + 03 | 4.51E + 01 | 48.11 | −3.02 | | | |
| 361 | 1.80E + 03 | 4.82E + 01 | 47.27 | 0.88 | 0.88 | | 0.88 |
| 362 | 1.81E + 03 | 4.80E + 01 | 47.27 | 0.73 | | | |
| 363 | 1.81E + 03 | 4.76E + 01 | 47.27 | 0.33 | | | |
| 364 | 1.82E + 03 | 4.96E + 01 | 47.27 | 2.29 | | | |
| 365 | 1.82E + 03 | 5.07E + 01 | 47.27 | 3.45 | | | |
| 366 | 1.83E + 03 | 4.78E + 01 | 47.27 | 0.52 | | | |
| 367 | 1.83E + 03 | 4.59E + 01 | 47.27 | −1.34 | | | |
| 368 | 1.84E + 03 | 4.56E + 01 | 47.27 | −1.69 | | | |
| 369 | 1.84E + 03 | 4.63E + 01 | 47.27 | −0.94 | | | |
| 370 | 1.85E + 03 | 4.51E + 01 | 47.27 | −2.22 | | | |
| 371 | 1.85E + 03 | 4.64E + 01 | 47.27 | −0.92 | | | |
| 372 | 1.86E + 03 | 4.67E + 01 | 47.27 | −0.61 | | | |
| 373 | 1.86E + 03 | 4.73E + 01 | 46.92 | 0.34 | | | |
| 374 | 1.87E + 03 | 4.63E + 01 | 46.92 | −0.63 | | | |
| 375 | 1.87E + 03 | 4.94E + 01 | 46.92 | 2.48 | | | |
| 376 | 1.88E + 03 | 4.85E + 01 | 46.92 | 1.58 | | | |
| 377 | 1.88E + 03 | 4.69E + 01 | 46.92 | 0.02 | | | |
| 378 | 1.89E + 03 | 4.68E + 01 | 46.92 | −0.08 | | | |
| 379 | 1.89E + 03 | 4.78E + 01 | 46.92 | 0.85 | | | |
| 380 | 1.90E + 03 | 4.68E + 01 | 46.92 | −0.11 | | | |
| 381 | 1.90E + 03 | 4.62E + 01 | 46.92 | −0.68 | | | |
| 382 | 1.91E + 03 | 4.47E + 01 | 46.92 | −2.18 | | | |
| 383 | 1.91E + 03 | 4.70E + 01 | 46.92 | 0.13 | | | |
| 384 | 1.92E + 03 | 4.76E + 01 | 46.92 | 0.71 | | | |
| 385 | 1.92E + 03 | 4.75E + 01 | 46.40 | 1.15 | 1.15 | 1.15 | 0.00 |
| 386 | 1.93E + 03 | 4.76E + 01 | 46.40 | 1.16 | | | |
| 387 | 1.93E + 03 | 4.59E + 01 | 46.40 | −0.49 | | | |
| 388 | 1.94E + 03 | 4.58E + 01 | 46.40 | −0.64 | | | |
| 389 | 1.94E + 03 | 4.86E + 01 | 46.40 | 2.25 | | | |
| 390 | 1.95E + 03 | 4.73E + 01 | 46.40 | 0.95 | | | |
| 391 | 1.95E + 03 | 4.67E + 01 | 46.40 | 0.33 | | | |
| 392 | 1.96E + 03 | 4.44E + 01 | 46.40 | −2.04 | | | |
| 393 | 1.96E + 03 | 4.49E + 01 | 46.40 | −1.50 | | | |
| 394 | 1.97E + 03 | 4.71E + 01 | 46.40 | 0.70 | | | |
| 395 | 1.97E + 03 | 4.49E + 01 | 46.40 | −1.50 | | | |
| 396 | 1.98E + 03 | 4.55E + 01 | 46.40 | −0.85 | | | |
| 397 | 1.98E + 03 | 4.72E + 01 | 51.90 | −4.70 | | | |
| 398 | 1.99E + 03 | 4.93E + 01 | 51.90 | −2.61 | | | |
| 399 | 1.99E + 03 | 5.21E + 01 | 51.90 | 0.18 | | | |
| 400 | 2.00E + 03 | 5.32E + 01 | 51.90 | 1.29 | | | |
| 401 | 2.00E + 03 | 5.19E + 01 | 51.90 | 0.00 | | | |
| | | | | | | 61.09 | 68.53 |
| | | | | | | Total | 129.62 |

What is claimed is:

1. A method of generating a noise index for a mechanical system, comprising:

acquiring noise data of the mechanical system over a predetermined frequency range;

choosing a fundamental harmonic frequency;

using the fundamental harmonic frequency to mark harmonic and sub-harmonic data bins for the acquired noise data and recording the amplitude thereof;

averaging a plurality of sub-harmonic bins equally offset from the center of each harmonic frequency and subtracting the average from the preceding harmonic level;

accumulating the results as harmonic content levels indicative of a condition of said mechanical system; and generating a harmonic noise index based on the accumulated harmonic content levels.

2. The method according to claim 1, wherein the mechanical system is a generator.

3. The method according to claim 2, wherein the harmonic noise index is indicative of keybar rattle of said generator.

4. The method according to claim 2, wherein noise data is acquired at full turbine load, but less than full generator load.

5. The method according to claim 1, wherein the fundamental harmonic frequency is one or the other of 100 Hz and 120 Hz.

6. The method according to claim 1, wherein the harmonic content levels are odd, even and total and the harmonic noise index is the total of the harmonic content levels.

7. A system for generating a noise index for a mechanical system, said system being configured to:

acquire noise data of the mechanical system over a predetermined frequency range;

use a fundamental harmonic frequency to mark harmonic and sub-harmonic data bins for the acquired noise data and record the amplitude thereof;

average a plurality of sub-harmonic bins equally offset from the center of each harmonic frequency and subtract the average from the preceding harmonic level;

accumulate the results as harmonic content levels indicative of a condition of said mechanical system; and generate a harmonic noise index based on the accumulated harmonic content levels.

8. The system according to claim 7, wherein said mechanical system is a generator.

9. The system according to claim 8, wherein the harmonic noise index is indicative of keybar rattle of said generator.

10. The system according to claim 8, said system is configured to acquire noise data at full turbine load, but less than full generator load.

11. The system according to claim 7, wherein the fundamental harmonic frequency is one or the other of 100 Hz and 120 Hz.

12. The system according to claim 7, wherein the harmonic content levels are odd, even and total and the harmonic noise index is the total of the harmonic content levels.

13. A computer-readable medium for storing computer-executable instructions for performing steps to generate a noise index for a mechanical system, the steps comprising:

using a fundamental harmonic frequency to mark harmonic and sub-harmonic data bins for noise data acquired from the mechanical system and recording the amplitude thereof;

averaging a plurality of sub-harmonic bins equally offset from the center of each harmonic frequency and subtracting the average from the preceding harmonic level;

accumulating the results as harmonic content levels indicative of a condition of said mechanical system; and generating a harmonic noise index based on the accumulated harmonic content levels.

14. The computer-readable medium according to claim 13, wherein the mechanical system is a generator.

15. The computer-readable medium according to claim 14, wherein the harmonic noise index is indicative keybar rattle said generator.

16. The computer-readable medium according to claim 14, wherein noise data is acquired at full turbine load, but less than full generator load.

17. The computer-readable medium according to claim 13, wherein the fundamental harmonic frequency is one or the other of 100 Hz and 120 Hz.

18. The computer-readable medium according to claim 13, wherein the harmonic content levels are odd, even and total and the harmonic noise index is the total of the harmonic content levels.

19. A system for generating a noise index for a mechanical system, said system comprising:

a data acquisition system for acquiring noise data of the mechanical system; and a data processing system for using a fundamental harmonic frequency to mark harmonic and sub-harmonic data bins for noise data acquired from the mechanical system and recording the amplitude thereof; averaging a plurality of sub-harmonic bins equally offset from the center of each harmonic frequency and subtracting the average from the preceding harmonic level; accumulating the results as harmonic content levels indicative of a condition of said mechanical system; and generating a harmonic noise index based on the accumulated harmonic content levels.

20. The system according to claim 19, wherein the data acquisition system and the data processing system are implemented as an application specific integrated circuit (ASIC).

21. The system according to claim 19, wherein the data acquisition system communicates the acquired noise data to the data processing system over a communication link.

22. The system according to claim 19, wherein the data acquisition system communicates the acquired noise data to the data processing system over the Internet.

* * * * *